United States Patent Office 2,926,122
Patented Feb. 23, 1960

2,926,122
METHOD OF PREPARING GLUCOSE OXIDASE

Louis Goldsmith, Fremont and Justin J. Murtaugh, Peter R. Wenck, and George E. Ward, Newaygo, Mich., assignors to Dawe's Laboratories, Inc., Chicago, Ill., a corporation of Illinois No Drawing. Application February 24, 1958
Serial No. 716,896

13 Claims. (Cl. 195—66)

This invention relates to the production of glucose oxidase and it relates more particularly to a new and improved process for the recovery of glucose oxidate from microorganisms and especially from the cells of fungi, such as molds of the genus Penicillium and Aspergillus or from the bacteria Acetobacter and Pseudomonas.

The enzyme glucose oxidase has previously been prepared by various methods. Muller (Biochemische Zeitschrift, volume 199, pages 136–170 (1928) and volume 232, pages 423–434 (1931), also Ergebnisse der Enzymforschung, volume 5, pages 259–272 (1936), prepared glucose oxidase by grinding the mycelium of *Aspergillus niger* or *Penicillium glaucum* with sand and infusorial earth, pressing out an aqueous juice in a Buchner press, and precipitating the enzyme by adding a mixture of ethyl alcohol and ethyl ether. The precipitated enzyme was filtered off and washed with absolute alcohol and then with ether, and dried in a vacuum.

Franke and Deffner, Annalen der Chemie, vol. 541, pages 117–150 (1939) studied the Muller procedure and found it to be inefficient; only one-tenth of the enzyme present in the mycelium was extracted into the press juice, and only about one-third of this extracted enzyme was precipitated by the ethyl alcohol-ethyl ether treatment. Franke and Deffner were able to precipitate about 85–90% of the enzyme present in the aqueous mycelial extract by treating the extract with 12 volumes of an ethyl alcohol-ether mixture (2:1). Such large volumes of alcohol-ether mixture would be difficult to use in a commercial operation. Acetone and dioxane were also found to precipitate glucose oxidase from aqueous solutions. The enzyme could be adsorbed onto kaolin or alumina, and eluted with M/15 $Na_2HPO_4$ solutions. It could also be precipitated by saturated ammonium sulfate.

Glucose oxidase, described under the name "Notatin," was isolated from *Penicillium notatum* by Coulthard, Michaelis, Short, Sykes, Skrimshire, Standfast, Birkinshaw and Raistrick (Biochemical Journal, vol. 39, pages 24–36 (1945)). The enzyme was precipitated from aqueous solution by acetone, by tannic acid, by Reinecke salt, and by ammonium sulfate, to obtain low yields of a partially purified product.

To the present, use is made of glucose oxidase for removing glucose or oxygen from various compositions and materials as in the removal of glucose from egg white prior to drying. It is used for removing oxygen from packaged, canned or bottled foods and beverages. For such uses, and other applications where it is desirable to remove glucose or oxygen, it is imperative to have a glucose oxidase which is substantially completely soluble in water; which has a low iron content (less than about 1.6 mg. of iron per 5,000 assay units of glucose oxidase), and which is stable in storage under widely varying conditions. For many applications, the need is for a glucose oxidase of high potency ranging from 10,000 to 80,000 or more assay units per gram and which is relatively free from reducing sugars. From a practical and from an economical standpoint, it is desirable to be able to produce glucose oxidase having the characteristics described in high yields and in a simple and efficient manner.

Systems which have previously been employed, as heretofore described, have been found to be deficient in one or more respects with reference to the aforementioned objectives in the manufacture of glucose oxidase in high yield, high potency and high purity.

It is an object of this invention to provide a new and improved process for producing the enzyme glucose oxidase.

More particularly, it is an object of this invention to produce glucose oxidase by a method which is capable of providing a glucose oxidase of high potency; which is capable of providing glucose oxidase in high yield; which is capable of providing a relatively pure glucose oxidase which is substantially free of iron; which is capable of providing a glucose oxidase which is substantially completely soluble in water; which makes use of relatively low cost and readily available materials in its preparation, and which is capable of producing glucose oxidase in a simple and efficient manner at low cost and with good economies.

It has been found that the glucose oxidase can be separated rather completely as a precipitate from its aqueous solutions by the treatment of the aqueous solutions with an alcoholic precipitant formed at least in part and preferably in its entirety of a propyl alcohol. The propyl alcohol may be extended with lower alcohols and preferably with methyl alcohol. It appears that a propyl alcohol is critical to the separation and precipitation of the enzyme in good yield and in a relatively pure state and that equivalent results are incapable of being secured when other alcohols are substituted for the propyl alcohol which is present as an essential component in the precipitant. While other alcohols, such as methyl alcohol, may be employed in combination with the propyl alcohol, complete substitution of the propyl alcohol cannot be effected without material loss in efficiency of recovery of the glucose oxidase.

Methyl alcohol has been found to cause inactivation of the enzyme glucose oxidate when brought into contact with the enzyme alone or in the presence of water. When methyl alcohol is used alone as the precipitating agent, the yield of glucose oxidase is inferior by comparison with the yield which is secured by employing a system embodying the features of this invention. By way of example, 25 ml. of an aqueous solution of glucose oxidase containing 2,070 units of glucose oxidase, when treated with 75 ml. of methyl alcohol, yielded a small precipitate which, when dried, amounted to only 0.0967 gram and contained only 3,980 units of glucose oxidase per gram. This amounted to a total of 385 units of glucose oxidase, representing only 19% of the original activity.

Similarly, ethyl alcohol is incapable of providing results equivalent to those which are secured by a precipitant system embodying the features of this invention. This is illustrated by the following: 9.5 liters of an aqueous solution containing 608,000 units of glucose oxidase, when treated with 19 liters of ethyl alcohol, yielded a precipitate which, when washed with alcohol and ether and then dried in vacuum, weighed only 35.5 grams and assayed 3,000 unit per gram. This is equivalent to a total potency of 106,500 units or only a 17.5% recovery. The foregoing is to be compared to a recovery at least three times greater and to activity which is beyond 10,000 assay units per gram when the same aqueous solutions are processed in accordance with the practice of this invention.

As the propyl alcohol, use can be made of n-propyl alcohol or isopropyl alcohol or mixtures of the one with the other in all proportions. The term "propyl alcohol" is also intended to include the corresponding water-azeotropes which in the case of the isopropyl alcohol-water azeotrope contains 12.6% by weight $H_2O$ and in the case of the n-propyl alcohol-water azeotrope contains 28.3% by weight H₂O, and it is intended to include alcohol and water mixtures in which as much as 30–35% by weight of water is present with the propyl alcohol.

In view of the adverse effect of methyl alcohol on glucose oxidase, as previously pointed out, it was somewhat surprising to find that, in the presence of the propyl alcohols, methyl alcohol does not operate to lower the efficiency of precipitation of glucose oxidase. Instead, the addition of methyl alcohol appears to improve the characteristics of the precipitation step, at least from the standpoint of the elimination of any tendency of the precipitate to be gummy and sticky, thereby to make it easier to filter, wash and dry the product. Methyl alcohol confers these desirable properties when it is used in the precipitating mixture over a rather wide range of proportions. The desirable effects can be secured when methyl alcohol is combined with the propyl alcohols in an amount to make up only 1% by volume of the precipitating mixture and the desirable results are also experienced when as much as 75% by volume of methyl alcohol is embodied in the alcoholic precipitant. When methyl alcohol is employed, it is preferred to make use of the methyl alcohol in about equal volumes, plus or minus 10%, with the propyl alcohol. In the presence of propyl alcohol, the methyl alcohol additive does not appear to inactivate or denature glucose oxidase.

In the practice of this invention it is desirable to make use of the alcoholic precipitant in an amount corresponding to one volume or more of the precipitant per volume of the aqueous solution of glucose oxidase. In the preferred practice of this invention, the precipitant is employed in the proportion of about one to six volumes per volume of the aqueous solution of glucose oxidase but more than six volumes can be employed if desirable. When a high proportion of the precipitant is used, more complete precipitation of the enzyme is achieved but more impurities are co-precipitated with the enzyme, resulting in a product containing less glucose oxidase per unit weight. On the other hand, when a lower proportion of precipitant is employed, the precipitation of the enzyme becomes more selective but less complete. This results in a precipitate containing a large quantity of glucose oxidase per unit weight. Good results are usually obtained by using two to three volumes of precipitant per volume of the aqueous enzyme solution.

When glucose oxidase of high activity, low iron content and complete water solubility is desired, the precipitate formed by the alcohol treatment of the aqueous enzyme solution can be redissolved or suspended in water to enable filtration through a bed of diatomaceous earth or other suitable filtering medium to remove the water-insoluble, non-enzyme components and to obtain a sparkling clear filtrate. The filtrate can then be treated with one to six volumes of the propyl alcohol or propyl alcohol-methyl alcohol precipitant, as previously described, to re-precipitate the enzyme in a purer state. The precipitate thus secured can be separated by filtration or by centrifugation and dried in air or in vacuum to yield a glucose oxidase containing at least 10,000 units of glucose oxidase per gram and less than 1.6 mg. of iron per 5,000 units of glucose oxidase. The product will contain substantially no reducing sugars and it will be completely soluble in water. By this process, it has been possible to secure glucose oxidase preparations containing as much as 50,000 units and more of glucose oxidase per gram.

The temperature at which the reactions are carried out to precipitate the enzyme from its aqueous solutions has not been found to be critical. Excellent results have been achieved with the materials at a temperature within the range of 5–35° C. Good results have been obtained in operation at room temperature, such as within the range of 20–30° C.

The glucose oxidase products obtained by the methods embodying the features of this invention have been found to have good stability. Such products have been subjected to stability tests by storage at temperatures within the range of 0–40° C. and they have been found to retain better than 90% and up to 99% of their original enzyme activity over storage periods of from three to six months.

The following example is given by way of a general description of the practice of this invention and is not to be taken by way of limitations in the concepts of this invention:

*Example 1*

A mycelial growth of a glucose oxidase-producing mold, such as a member of the genus Aspergillus or of the genus Penicillium, is produced in the usual manner well known to the trade. A preferred organism is *Aspergillus niger* which is known to be rich in glucose oxidase when it is grown on glucose-containing substrates.

The mycelium is ground to rupture the cells and to release the enzyme and the ground mycelium mass is extracted with water or saline solution to obtain a water solution of the glucose oxidase. The water solution will contain other water soluble mycelial constituents including the desirable constituent, the enzyme catalase.

At this stage, the aqueous solution will usually contain about 30–200 assay units of glucose oxidase per ml.

The aqueous solution is then treated with the alcoholic precipitant preferably by the addition of one to six volumes of the alcohol or alcohol mixture at a temperature of 5–35° C. to precipitate the enzyme. As previously pointed out, the alcohol precipitant may be n-propyl alcohol or isopropyl alcohol or mixtures thereof and the alcohol mixture may be the propyl alcohols or the mixture of either or both with methyl alcohol. As previously stated, the precipitating mixture can be anhydrous but it need not be anhydrous. A precipitate of the enzyme forms, which will contain the catalase which may be present.

The precipitate is filtered for separation from the filtrate and then it is washed with a small quantity of a dehydrating liquid such as a propyl alcohol, acetone, or ether, and then dried in air or in a vacuum oven to yield a powder of the enzyme product.

When it is desirable to make the product substantially completely soluble in water and to remove undesirable impurities, such as iron, the washed precipitate is redissolved or suspended in water in amounts to give a concentration of about 300–2000 assay units per ml. Usually, the precipitate will not completely dissolve in water due to the presence of iron-containing impurities and non-enzyme impurities which have been denatured by the propyl alcohol used in the first precipitant. The insoluble matter is separated by filtration or the like preferably by passing the solution or suspension through a bed of diatomaceous earth to obtain a sparkling clear filtrate. The filtrate is treated by the addition of from one to six volumes of the alcoholic precipitant corresponding to the compositions previously described. The mixture is stirred and then filtered or centrifuged to separate the enzyme powder as a precipitate which may be washed with a small quantity of a dehydrating liquid, such as a propyl alcohol, acetone or ether, and then dried in vacuum or air dried. The product obtained will be found to be substantially completely soluble in water and to have a potency greater than 10,000 assay units of glucose oxidase per gram. It will contain less than 1.6 mg. of iron per 5,000 units of glucose oxidase.

The assay unit of glucose oxidase is defined as that quantity of enzyme which catalyzes the formation of 1/60 milli-equivalent of gluconic acid in 15 minutes at 35° C. when a standard glucose-buffer substrate (pH 5.1) is employed under standard conditions. This assay unit is well known to those skilled in the art.

The following are given by way of specific examples of the practice of this invention:

Example 2

150 pounds of damp *Aspergillus niger* mycelium containing 119.8 units of glucose oxidase per gram (total 8.15 million units) was ground for 30 minutes. The ground mycelium was then centrifuged and washed with water. 80 liters of centrifugate was collected, assaying 89.6 assay units per ml., or a total of 7.16 million units which correspond to an 88% recovery. 160 liters of 91% isopropyl alcohol was added at room temperature with agitation. A fluocculent precipitate soon appeared and after standing for 10 minutes, the precipitate was collected by centrifugation. The precipitate was removed and washed with isopropyl alcohol followed by a second wash with ethyl ether and then it was spread on shallow pans for air drying overnight. A yield of 382.2 grams was obtained, assaying 15,790 units per gram. This corresponds to a total of 6.02 million units and is equivalent to 74% of original activity.

Example 3

10 kg. of damp *Aspergillus niger* mycelium containing 226 assay units of glucose oxidase per gram (total 2.26 million assay units) was ground with 10 liters of water for one hour in a dough mixer. The slurry was filtered and provided a filtrate amounting to 11.2 liters which assayed 107.8 units per ml. and therefore contained a total of 1.21 million units of the enzyme.

One volume (11.2 liters) of n-propyl alcohol was added to the aqueous extract with stirring and the mixture was allowed to stand overnight at room temperature. The precipitate was separated by centrifugation and washed with 200 ml. of n-propyl alcohol followed by a wash with 100 ml. of ether and then it was dried in vacuo at room temperature. A powder was secured weighing 27.6 grams and assaying 35,300 units per gram. The total activity was 975,000 units of glucose oxidase, representing 43% of the original mycelium activity. The product was soluble in water and contained 1.5 mg. of iron per 5,000 units of glucose oxidase and was free of reducing sugars.

Example 4

300 pounds of damp *Aspergillus niger* mycelium containing 132.9 assay units of glucose oxidase per gram (total 18.1 million units of glucose oxidase) was ground for 30 minutes. The ground mycelium was filtered and washed to yield 200 liters of aqueous extract containing 74 units of glucose oxidase per ml., or 14.7 million units. This represented an 81% recovery at this stage.

Three volumes of a mixture of equal parts by volume of isopropyl alcohol and methyl alcohol was added with stirring to the extract. A precipitate formed which was separated out by centrifugation. The separate precipitate was then taken up in water and filtered to give 11.5 liters of solution containing 994 units of glucose oxidase per ml., or a total of 11.4 million units of glucose oxidase. This is equivalent to 63% of the original activity at this stage of the process.

Three volumes (34.5 liters) of a mixture of equal parts by volume of isopropyl alcohol and methyl alcohol was added at room temperature and with stirring to the 11.5 liters of the aqueous solution. The precipitate which resulted was separated by filtration and then washed first with isopropyl alcohol and then with acetone. After washing, it was dried in vacuo at room temperature. The dry powder weighed 196.5 grams and assayed 49,500 units of glucose oxidase per gram. This corresponded to a total recovery of 9.7 million units of glucose oxidase or 54% of the original activity. The resulting product was completely soluble in water and contained only 0.03 mg. of iron per 5,000 units of glucose oxidase and it was found to be free from reducing sugars.

Example 5

600 pounds of damp *Aspergillus niger* mycelium containing 29.25 million units of glucose oxides was ground for 90 minutes. The ground mycelium was centrifuged and washed until 646 liters of aqueous extract was collected. Three volumes formed of an equal proportion by volume of isopropyl alcohol and methyl alcohol was added with stirring at room temperature to the aqueous extract. A precipitate formed and after 10 minutes the precipitate was separated out by centrifugation. The precipitate was taken up in water and filtered to obtain a volume of 51.7 liters. The solution was mixed with three volumes made up of equal proportions of isopropyl alcohol and methyl alcohol and the mixture was allowed to stand overnight at room temperature. The precipitate that formed was separated out on a Buchner funnel and washed with isopropyl alcohol and then with acetone prior to drying overnight in vacuo. A yield in the form of a power was obtained which weighed 2142.3 grams and assayed 13,350 units of glucose oxidase per gram. The total activity was 28.6 million units of glucose oxidase which represented a yield of 97.9% based on the original activity. The powder was completely soluble in water, it was free from reducing sugar and it contained only 0.03 mg. of iron per 5,000 assay units of glucose oxidase.

While the foregoing examples make use of the mycelium of *aspergillus niger*, it will be understood that the mycelium of other fungi or molds capable of producing glucose oxidase might be employed and it will be further understood that the concepts described and claimed herein have application for the procurement of the glucose oxidase from aqueous solutions whether derived from molds of the types described or from bacteria or other microorganisms. By way of still further variation, the desired results can be secured by the addition of the solution to the precipitant as well as by addition of the alcoholic precipitant to the solution of glucose oxidase.

It will be further understood that changes may be made in the details of the processing steps and materials without departing from the spirit of the invention, especially as defined in the following claims.

We claim:

1. In the method of producing glucose oxidase the steps of admixing an aqueous solution of glucose oxidase and a precipitant in the form of an alcohol system composed at least in part of a propyl alcohol to precipitate out the glucose oxidase from solution, and separating the precipitate from the remainder.

2. The method as claimed in claim 1 in which the alcohol precipitant is added to the aqueous solution of the glucose oxidase in an amount corresponding to one part by volume of the aqueous solution to one to six volumes of the precipitant.

3. The method as claimed in claim 1 in which the alcohol precipitant comprises an alcohol selected from the group consisting of n-propyl alcohol and isopropyl alcohol and mixtures thereof, and mixtures thereof with a lower alcohol.

4. The method as claimed in claim 3 in which the lower alcohol comprises methyl alcohol present in an amount in the alcohol system within the range of 1–75% by volume of the alcohol system, the remainder being the propyl alcohol.

5. The method as claimed in claim 1 which includes the additional steps of taking up the separated precipitate with water to redissolve the glucose oxidase, separating the non-soluble components from the soluble components dissolved in the aqueous system, adding a precipitant to the aqueous system formed of an alcohol selected from the group consisting of n-propyl alcohol and isopropyl alcohol and mixtures thereof, and mixtures thereof with methyl alcohol, allowing the material to stand to form a precipitate, and then separating the precipitate as a product from the remainder.

6. A process for the production of glucose oxidase from glucose oxidase-producing molds which comprises grinding the damp mold cells to make an aqueous extract of glucose oxidase, separating the aqueous extract from the spent mold cells, treating the aqueous extract with one to six volumes of a precipitant formed in part at least of a propyl alcohol, allowing the materials to stand to form a precipitate, and separating the precipitate containing glucose oxidase.

7. The process as claimed in claim 6 which includes the additional step of washing the precipitate with a dehydrating liquid selected from the group consisting of propyl alcohol, acetone and ether.

8. The process as claimed in claim 7 which includes the further step of drying the washed precipitate to produce a glucose oxidase-containing powder.

9. The process as claimed in claim 6 in which the glucose oxidase-producing molds are members of the group selected from the genus Aspergillus and the genus Penicillium.

10. The process as claimed in claim 6 in which the propyl alcohol is an alcohol selected from the group consisting of n-propyl alcohol, isopropyl alcohol, the azeotrope of n-propyl alcohol and water, the azeotrope of isopropyl alcohol and water and mixtures thereof.

11. The process as claimed in claim 6 in which the alcohol precipitant is formed of a mixture of a propyl alcohol and methyl alcohol in which the methyl alcohol is present in an amount within the range of 1–75% by volume, the remainder being the propyl alcohol.

12. The process as claimed in claim 6 in which the precipitant is added at a temperature within the range of 5–35° C.

13. A process for the production of glucose oxidase from glucose oxidase-producing molds which comprises grinding the damp mold cells to make an aqueous extract of glucose oxidase, separating the aqueous extract from the spent mold cells, treating the aqueous extract with one to six volumes of a precipitant formed in part at least of a propyl alcohol, allowing the materials to stand to form a precipitate, separating the precipitate containing glucose oxidase from the remainder, suspending the separated precipitate in water in an amount to provide 300–2000 units of glucose oxidase per ml., separating the non-soluble components of the suspension from the soluble components in solution in the water, adding one to six volumes of an alcohol precipitant per volume of solution wherein the alcohol precipitant is formed of a material selected from the group consisting of n-propyl alcohol, isopropyl alcohol and the azeotropes thereof and mixtures thereof and mixtures thereof with methyl alcohol, permitting the alcohol-aqueous solution mixture to form a precipitate, separating the precipitate from the remainder, and then washing and drying the precipitate to yield a product containing glucose oxidase.

References Cited in the file of this patent

UNITED STATES PATENTS

| 2,417,584 | Berkinshaw et al. | Mar. 18, 1947 |
| 2,482,724 | Baker | Sept. 20, 1949 |
| 2,635,069 | Baker | Apr. 14, 1953 |

OTHER REFERENCES

Florey et al.: Antibiotics (1949), vol. 1, Oxford Univ. Press, N.Y., pages 353–355.

Foster: Chemical Activities of the Fungi, 1949, Academic Press, Inc., N.Y., page 463.

Colowick et al.: Methods in Enzymology (1955), vol. 1, Academic Press, Inc., pages 340–345.